United States Patent Office 3,469,408
Patented Sept. 30, 1969

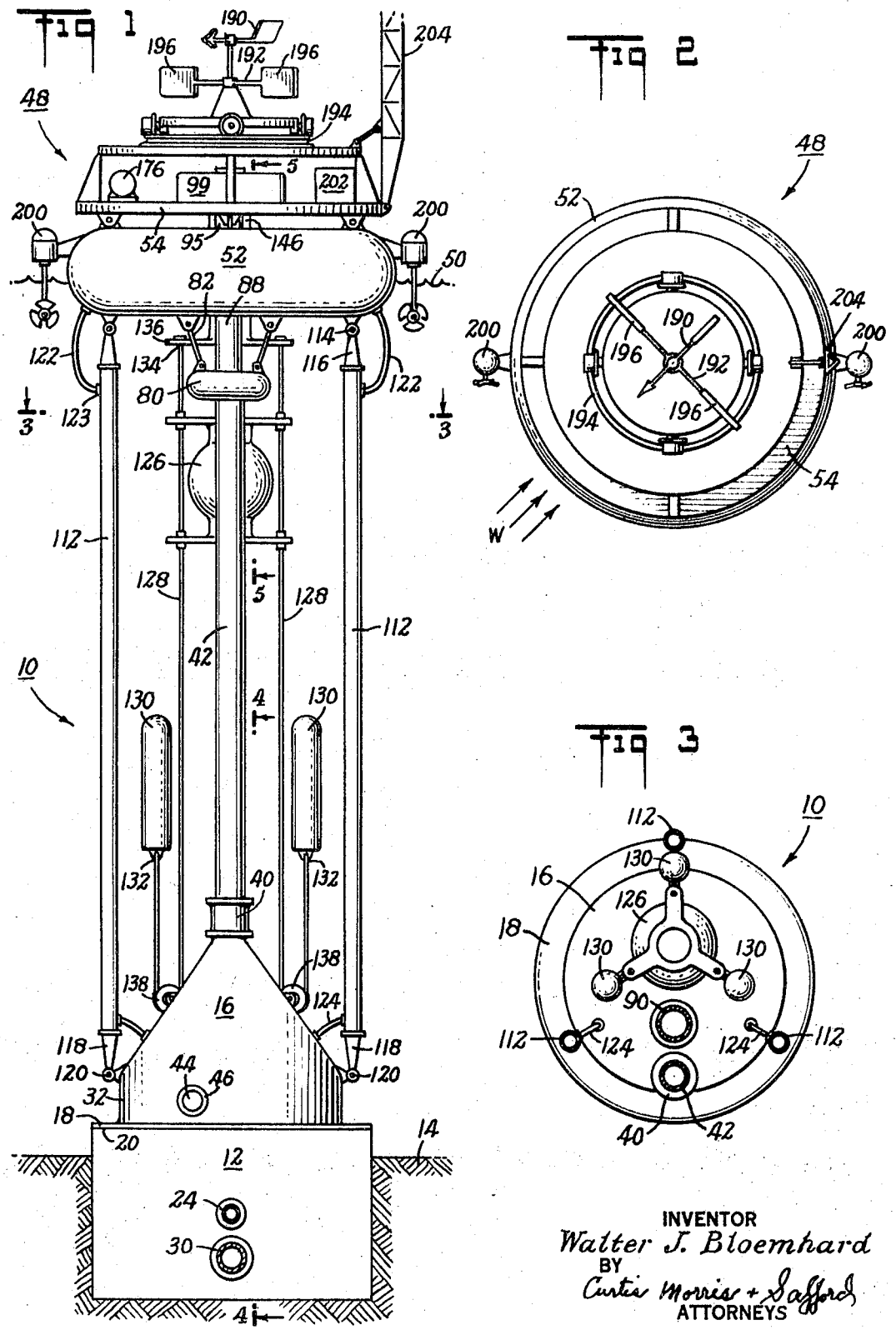

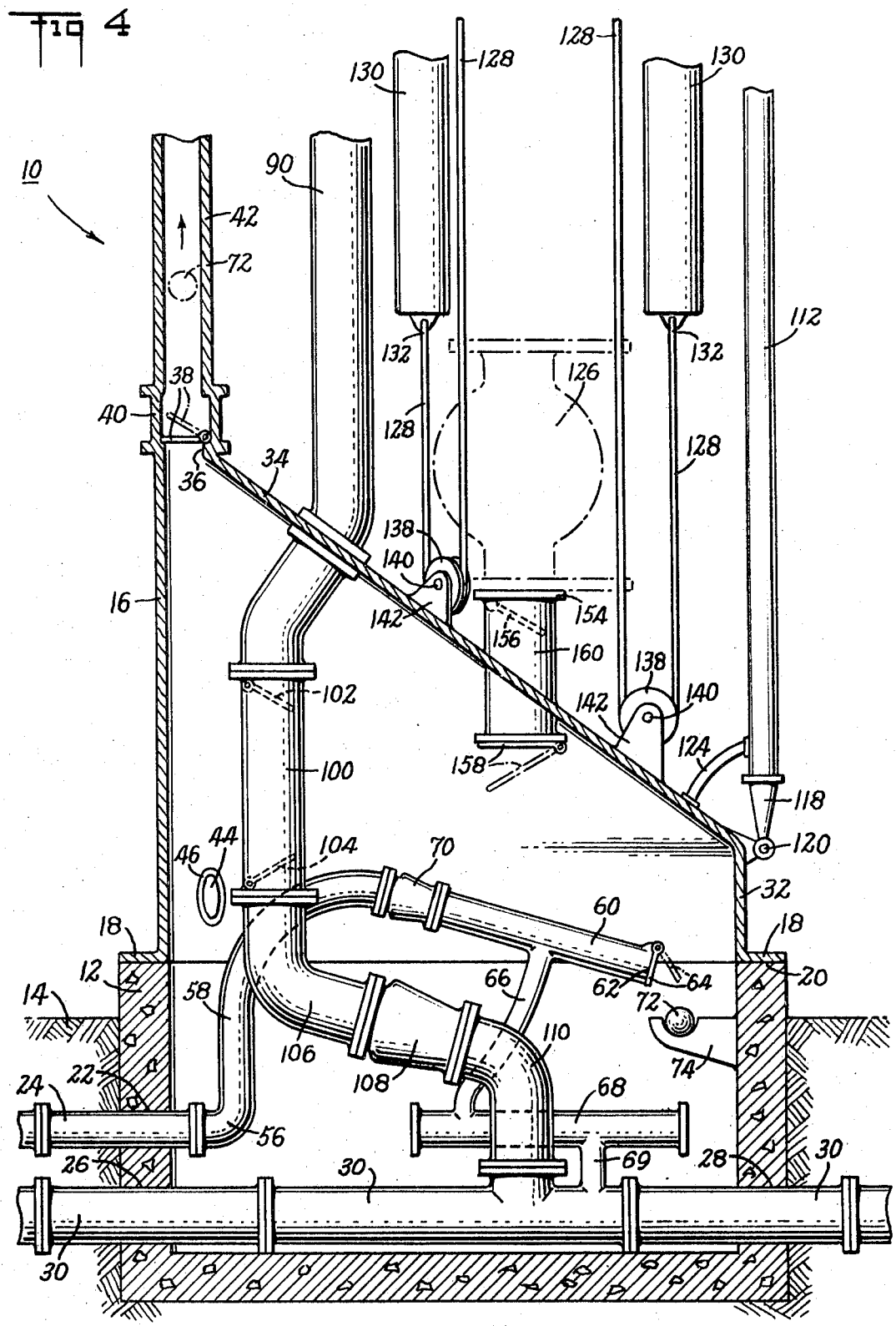

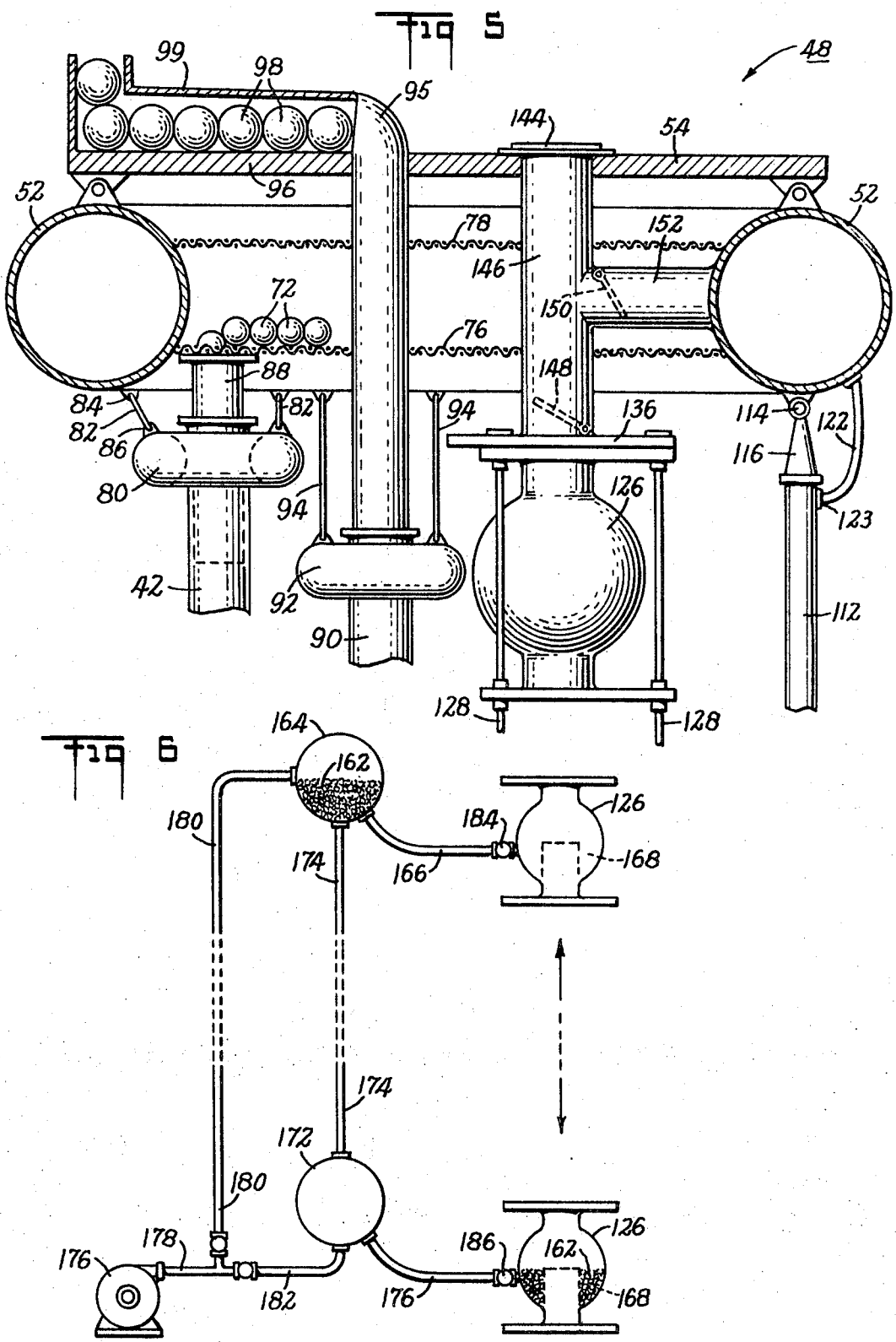

3,469,408
APPARATUS FOR LAUNCHING AND EXTRACTING SPHEROIDS IN UNDERWATER PIPELINES
Walter J. Bloemhard, Hicksville, N.Y., assignor to Columbia Gas System Service Corporation, New York, N.Y., a corporation of Delaware
Filed Jan. 5, 1968, Ser. No. 696,051
Int. Cl. B63c 11/38; B08b 9/04; F17d 1/00
U.S. Cl. 61—69                                10 Claims

ABSTRACT OF THE DISCLOSURE

An apparatus for launching and extracting spheroids in underwater pipelines is disclosed wherein the launching and extracting units are positioned in a chamber below the water surface at pipeline level. Storage for the extracted spheroids and for the spheroids to be inserted in the pipeline is provided in a floating platform which is moored to the submerged chamber. The launching and extracting is accomplished automatically with the extracted spheroids rising to the platform to be stored and launching spheroids descending to the pipeline from the platform. Provision is also made to allow maintenance of the submerged equipment and to continuously retain the platform in proper orientation over the submerged chamber.

---

This invention relates to the launching, extracting and handling of spheroids in submerged pipeline systems and is particularly concerned with apparatus for that purpose.

In underwater pipeline systems used for gathering gas and oil from off-shore drilling operations both gaseous hydrocarbon products and liquid petroleum products are often transmitted through the same pipeline system. In this type of system the gas and oil from the individual producing wells are pumped through small diameter feeder lines to a collection point where a number of feeder lines join a large diameter gathering line through which the gas and oil is pumped back to shore for processing.

In two-phase flow where a gas and liquid are pumped through the same line, several types of flow patterns occur due to particular conditions within the system, e.g., pressure, flow velocity, grade, resistance to flow. Thus, the flow pattern may be laminar, wherein there is a distinct separate layer of gas and liquid, or there may be bubbles of gas interspersed in the liquid, or one of predominately gas flow with interspersed bubblets of liquid spray. All of these flow patterns demand a higher pumping effort than is required for single-phase flow.

To improve the flow pattern "pigs" or "spheroids," which may be inflatable balls of a synthetic rubber or other elastomeric material, are periodically inserted into the pipeline. The effects of these spheroids or pigs in the line is to divide the flow into clearly delineated regions of essentially one-phase fluid flow. Slugs of liquid are generally ahead of the sphere with gas pockets immediately behind it. The spheroids are generally of the same diameter as the internal diameter of the pipeline or of slightly less diameter to permit free flow through the pipeline. The stabilized flow pattern resulting creates less resistance to flow and consequently is more economical to transport as high pumping pressures are obviated.

Spheroid launchers and extractors are provided at junction points where small diameter feeder lines meet the large diameter gathering lines in order to remove the small diameter spheroids and to inject the large diameter spheroids. Under current practices, these "sphering stations" are at the surface of the body of water, on specially erected platforms which rest on the sea bottom. At each of these stations the pipeline is held at the surface, above its normal position on the sea bottom, so that the exchange of spheroids can be accomplished. The sphering operation is extremely costly and inefficient because in order to allow a relatively simple operation to be performed, it requires large stable platforms in deep water and expensive pumping equipment to carry the hydrocarbon products from the sea bottom pipeline level to the platform pipeline level.

Accordingly, it is an object of the present invention to provide a novel apparatus for launching and extracting spheroids in an underwater pipeline system. A further object of the present invention is to provide an apparatus for launching and extracting spheroids in an underwater pipeline system at normal sea bottom pipeline depth. A further object of the present invention is to provide an apparatus for launching and extracting spheroids that is automatic in operation and may be controlled from a remote location. A still further object of the present invention is to provide an apparatus for launching and extracting spheroids in underwater pipeline systems that does not necessitate the erection of large stabilized platforms to accomplish the sphering operation. These and other objects will be in part obvious and in part pointed out below.

In accordance with the present invention a concrete caisson is imbedded in the sea bottom enclosing the junction of feeder and gathering lines, and a cover is attached. Spheroid extractors and a launcher are positioned within the caisson to extract spheroids from the feeder lines and launch spheroids in a gathering line within the caisson. The spheroids are stored in a floating platform which is moored to the caisson and are transported to and from the caisson by riser lines. When a spheroid is extracted, it is caught in a holding tray, and the caisson is flooded forcing the buoyant spheroid to ascend in a riser line to the platform. A spheroid to be launched is released from a storage area on the platform and descends in a riser line to the launcher in the caisson where it is launched in the gathering line. A submersible diving chamber is provided to enable maintenance men to descend from the platform to the submerged caisson and a gyroscopic compass controls the attitude of the platform relative to the caisson to prevent twisting of the interconnecting lines.

In the drawings:
FIGURE 1 is a diagrammatic elevational view showing the submerged caisson, cover, riser, lines and floating platform;
FIGURE 2 is a top plan view of the apparatus of FIGURE 1;
FIGURE 3 is a view taken on line 3—3 of FIGURE 1;
FIGURE 4 is a view, partly in section, taken on line 4—4 of FIGURE 1 showing deails of the submerged caisson;
FIGURE 5 is an elevational view, partly in section, taken on line 5—5 of FIGURE 1 showing details of the floating platform; and
FIGURE 6 is a diagrammatic representation of the submersible diving chamber showing the manner in which the chamber ascends and descends.

Referring now to FIGURE 1, there is shown an underwater sphering station 10 which includes a concrete caisson 12 imbedded in the sea bottom 14 and a caisson cover 16 with a peripheral flange 18 which is firmly affixed to the top wall 20 (FIGURE 4) of the caisson 12.

With reference to FIGURE 4 also, it is seen that an access hole 22 is provided in the wall of caisson 12 to allow a feeder line 24, which is buried in the sea bottom 14, to enter the caisson. It is to be understood that provision for more than one feeder line 24 may be made to enter the caisson and that the access hole includes seals to preclude entry of sea water into the caisson. Similarly, access holes 26 and 28 respectively, of a larger diameter than hole 22 are provided to allow a larger diameter gathering line 30 to enter the caisson.

The caisson cover 16 is generally cylindrical in its base portion 32 and is conically shaped in its upper portion 34 with an outlet 36 at its highest elevation. A swing gate 38, housed in a cylindrical flanged coupling 40, is operable from a first position which effectively seals the caisson to a second position allowing fluid communication between the interior of the caisson and a riser line 42. A gate valve 44 in port 46 in the wall of cover 16 provides a means for flooding with sea water the interior of the caisson. A floating platform 48 is provided at the water surface 50 to house the necessary power supplies and equipment to operate the sphering station and also to act as a storage facility for the extracted small diameter spheroids ad the larger diameter spheroids which are to be injected into the pipeline system. The platform, described in more detail hereinafter, includes a buoyant ring 52 and an equipment platform 54.

Extraction of the smaller diameter spheroids is accomplished in the following manner: the spheroids carried by the feeder line 24 are diverted by elbow 56 through an upstanding pipe section 58 to a spheroid extractor 60. The extractor 60 is inclined downwardly and is open at its end 62 and sealed by a swing gate 64 which is normally retained in tight sealing engagement with the end 62 of the extractor. A bypass line 66 connects the extractor 60 with a manifold 68 and allows diversion of the fluid from the feeder line through the bypass line 66 into the manifold 68 and thence through bypass line 69 into the larger diameter gathering line 30. A block valve 70 in the extractor 60 traps the spheroid flowing in the feeder line system. A signal is then transmitted to the swing gate 64 causing that gate to swing open allowing a trapped spheroid 72 to drop out into a receiving tray 74 that is affixed to the wall of caisson 12. The swing gate then closes and the fluid flowing in the feeder line is diverted into the manifold. In operations where no spheroids are sent through the pipeline system the fluid is allowed to flow through the same system with all block valves and traps open.

Up to this point in the sequence of operations the interior of the caisson is air pressured with no water being present. The flood valve 44 now opens allowing sea water to enter the caisson, and the spheroid 72, being buoyant, floats on the top of the water that is flooding the caisson. Due to the conical configuration of the cover 16, the spheroid 72 is directed to the opening 36 in the caisson cover at the highest elevation. When the caisson has been completely flooded the pressure just below swing gate 38 is approximately equal to the pressure head in the always flooded riser line 42, and the swing gate opens allowing the buoyant spheroids to ascend in riser line 42.

Referring now to FIGURE 5, there is shown a detail of the upper end of riser line 42. The riser line 42 terminates below the water surface 50 and has affixed to it at that point a buoyant collar 80 which imparts a buoyant force to the riser line to maintain it in a vertical position. Snubbers 82 pivotally connected at 84 to the buoyant ring 52 and at 86 to the collar 80 hold the riser line fixed to the platform yet allow limited movement relative to the platform as the platform moves due to wave action. A short section of pipe 88 is telescoped within the top portion of riser line 42 and passes through the grating 76. The telescoping connection accommodates the bobbing to which the platform is subject because of wave and current action. The extracted spheroids 72 in riser line 42 float to the surface and are trapped between gratings 76 and 78 respectively at the water surface. Gratings 76 and 78 are circular and are firmly affixed at their peripheries to the internal diameter of ring 52. Since the gratings are porous and grating 76 is slightly below the water surface level 50, the extracted spheroids are free to float within the confines of the gratings until they are collected.

The larger diameter spheroids 98 are injected into the pipeline system through riser line 90 which includes a buoyant collar 92 at its upper end, snubbers 94 and telescoping section 95 which extends through the grating 76 and 78 to the storage platform 96. A supply of large diameter spheroids 98 are stored on the platform in a storage area 99 and are fed automatically to riser line 90. At its lower end riser line 90 is affixed to the upper portion 34 of caisson cover 16 and meets a lock 100, which includes a pair of swing gates 102 and 104, respectively. The riser line 90 is normally flooded and when it is desired to inject a spheroid 98 the line is pumped out causing the buoyant spheroid 98 to descend within the riser line 90 as the water is removed. When the line is pumped dry, the spheroid is resting on the upper swing gate 102, and at this time, this gate is opened to allow the spheroid to fall to the second swing gate 104. Gate 104 is now opened to allow the spheroid to enter the launching tube 106. A block valve 108 in the inclined launching tube 106 retains the spheroid until the proper moment for launching and then allows the spheroid to pass from the launcher 106 through the elbow connection 110 into the pipeline 30.

The floating platform 48 is secured to the submerged caisson by means of hollow tubes 112 which are pivotally connected, as at 114, at their upper ends to the underside of ring 52 by a swivel joint 116 which is secured to the upper end of the tube 112. Similarly, at the lower end of tube 112 swival joint 118 is pivotally connected at 120 to the caisson cover to secure tube 112 to the submerged caisson. An open, pressurized hose 122 connects the pressurized ring 52 to the upper end of hollow tube 112 at 123, while a pressurized hose 124 at the bottom of the tube 112 provides a fluid communication between tube 112 and the interior of the caisson. In this manner air pressure necessary to blow out the water within the caisson is supplied to the caisson.

Access to the submerged caisson is provided by a submersible diving chanmber 126 which is movable from the platform 48 to the caisson 12 along guide cables 128 connecting the platform to the caisson. The guide cables 128 are kept taut by submerged buoyant members 130 which are connected to ends 132 of the guide cables 128. The other end 134 of the guide cables 128 are fixed to a submerged mooring platform 136 on the underside of the floating platform 48. The guide cables 128 pass around the pulleys 138 rotatably mounted at 140 to bearing block 142 on the upper portion 34 of the caisson cover 16. Thus the buoyant force imparted by the buoyant member 130 tends to maintain the guide cables 128 in a taut condition yet allow limited movement resulting from waves acting on the floating platform 48.

Access to the submersible diving capsule from the platform 48 is through a door 144 into a lock 146 and then through door 148 in the mooring platform 136 to the capsule 126, which is maintained firmly affixed to the mooring platform 136. After the maintenance men have entered the lock 146, the door 144 is sealed and a swing gate 150 in the wall of the lock 146 is opened to allow the lock to be pressurized through an air passage 152 which is in communication with the pressurized ring 52. The capsule 126 is also pressurized and after the men enter the capsule, the capsule is sealed and allowed to descend to the caisson under pressure. When the capsule reaches the caisson depth it is moored to a submerged mooring platform 154, the water is forced out of the caisson 12, and the caisson is air pressurized to the same pressure as the pressure in the capsule 126. Swing gates 156 and 158, respectively, are opened and allow the maintenance men to enter from the capsule through the entrance lock 160.

With reference to FIGURE 6, the capsule 126 is designed so that with the prescribed number of maintenance men inside the capsule has a slight positive buoyancy allowing it to ascend under its own power. To cause the capsule to descend, a predetermined amount of steel shot 162 from a storage drum 164 is blown by air pressure through coupling hose 166 into a shot chamber 168 in the capsule 126. The weight of the steel shot overcomes the buoyancy of the capsule and the capsule then descends to the caisson. When it is desired to allow the capsule to ascend, the steel shot is sucked out of the capsule through hose 176 into a storage tank 172, and the capsule then ascends. The two storage tanks 164 and 172 are interconnected by a transfer line 174 through which the steel shot may be transferred from the lower storage tank 172 to the upper storage tank 164. The air pressure necessary to transfer the shot is supplied by a pump 176 through supply lines 178, 180 and 182 respectively. Each of the connecting hoses 166 and 170 are fitted with quick connect and disconnect couplings 184 and 186 respectively which are automatically connected when the capsule approaches the coupling and are disconnected when the capsule starts its movement.

The attitude of the platform 48 with respect to the caisson 12 must be maintained fairly constant to prevent the platform from rotating and twisting the various lines and connecting cables. The platform is thus provided with a gyrocompass or a magnetic compass (not shown) similar to an autopilot so that the relative position of the platform can be determined. A wind indicator vane 190 is provided (see FIGURE 2) to sense the wind direction, indicated by arrows, as well as a double pane wind vane 192 which is rotatably mounted on a circular track 194 so that the wind vane may rotate 360°. The attitude of the platform is constantly monitored by the gyrocompass and compared with the pre-set attitude of the platform. If there is a difference, a signal is sent which releases the wind vane 194, and the vane is allowed to rotate freely. The wind panels 196 take up an equilibrium position 90° to the wind direction and the wind indicator vane. The wind vane is then locked to the track 194 which is firmly affixed to the platform and thus the wind vane balances the platform and prevents rotation which is due to the wind effect. When the wind direction shifts, the indicator 190 senses the new direction and the process is repeated.

If the wind velocity drops down below the point where sufficient power can be derived for reorienting the platform, a signal is transmitted to a pair of outboard motors 200 which are affixed to the outside of ring 52. The platform can then be held to its predetermined attitude by motor control by the outboard motors. This is achieved by controlling either the r.p.m. of the propellers and/or the pitch of the propeller blades.

Mounted on the platform itself is a power control package 202 which includes the necessary equipment such as generators, batteries, pumps, compressors, instruments, to operate the sphering station. There is also a microwave antenna mast 204 and associated microwave receiving equipment (not shown) to receive operating signals from ashore if it is found necessary to control any of the operations.

It is thus evident that the apparatus of the present invention provides a means for automatically removing small diameter spheroids from a feeder line and inserting larger diameter spheroids into a larger diameter gathering line at an off-shore location. The apparatus of the present invention is relatively mobile as it can be transported to location and installed without the necessity of building a submerged superstructure and then diverting the submerged pipelines up to a surface platform where the sphering operation is carried out and then returning the pipeline to the submerged position.

What is claimed is:

1. In an apparatus for extracting and launching spheroids in an underwater pipeline system, a submerged housing imbedded at pipeline level and adapted to receive a feeder line and a gathering line, means within said housing to extract spheroids from said feeder line, means to divert fluid flow from said feeder line into said gathering line, and means to launch spheroids into said gathering line.

2. The apparatus as described in claim 1 which includes a platform adapted to float at the water surface and to store said extracted spheroids and the spheroids to be launched, vertical means connecting said platform with said submerged housing.

3. The apparatus as described in claim 2 wherein said housing includes means to selectively flood and evacuate said housing with sea water, spheroid-receiving means in said housing, said means to extract spheroids being positioned to deposit said extracted spheroids in said receiving means, said vertical means including a flooded first riser line, whereby when said housing is flooded said spheroids float to the top of said housing and into said first riser line thereby to ascend in said first riser line to a storage area in said platform.

4. The apparatus described in claim 2 wherein said platform includes means to store said pheroids to be launched, a second riser line extending from said platform to said housing for transferring said spheroids to be launched from said platform to said housing, said means to launch said spheroids in said housing being in communication with said second riser line and operable to receive and launch spherods into said gathering line at predetermined times.

5. The apparatus described in claim 2 which includes a submersible diving chamber movable between a first position adjacent said platform and a second position adjacent said housing thereby to provide a means for transferring personnel from said platform to and from said submerged housing.

6. The apparatus described in claim 5 wherein said diving chamber when loaded with its normal complement of personnel has a slight positive buoyancy tending to maintain it at the water surface, said diving chamber including a ballast chamber adapted to receive weighted ballast, means to transfer ballast means from a first storage chamber to said diving chamber to cause said diving chamber to acquire a negative buoyancy thereby to cause said chamber to descend to said housing, means to transfer ballast means from said ballast chamber to a second storage chamber to thereby impart a positive buoyancy to said chamber to allow it to ascend to said platform.

7. The apparatus described in claim 2 wherein said platform includes means to monitor the attitude of said platform with respect to said housing, means to sense a deviation of said platform from a predetermined attitude with respect to said housing, said means to monitor and said means to sense deviation being operable to reorient said platform to said predetermined attitude.

8. An underwater sphering station including a submerged housing a small diameter spheroid extractor within said housing, a large diameter spheroid launcher within said housing, said extractor being in fluid communication with a small diameter feeder line and operable to extract spheroids from said feeder line, said launcher being in fluid communication with a larger diameter gathering line and operable to launch spheroids into said gathering line, a bypass line from said extractor to said gathering line to divert fluid from said extractor to said gathering line.

9. The apparatus described in claim 8 including a platform adapted to float at the water surface, said platform being interconnected with said submerged housing and adapted to provide a storage area for said extracted spheroids and said spheroids to be launched, means to selectively evacuate and flood said submerged housing, said spheroid extractor operable to place an extracted spheroid within said housing whereby upon flooding said extracted spheroid is forced upward by the flooding water into and up a riser line interconnecting said housing with said storage area for said extracted spheroids.

10. The apparatus described in claim 9 including means to automatically release a spheroid from said storage area for spheroids to be launched into a riser line interconnecting said platform and said launcher within said housing thereby to release a spheroid into said gathering line at a predetermined time.

References Cited

UNITED STATES PATENTS

| | | | |
|---|---|---|---|
| 2,190,330 | 2/1940 | Martine | 61—69 |
| 3,121,954 | 2/1964 | Foster | 61—69 |
| 3,125,116 | 3/1964 | Schaberg | 15—104.06 X |
| 3,135,278 | 6/1964 | Foord et al. | 15—104.06 X |
| 3,148,689 | 9/1964 | Bean et al. | 15—104.06 X |
| 3,186,014 | 6/1965 | Allen | 15—104.06 X |
| 3,246,666 | 4/1966 | Park et al. | 15—104.06 X |
| 3,291,217 | 12/1966 | Wakefield | 15—104.06 X |
| 3,384,512 | 5/1968 | Frederick et al. | 15—104.06 X |

DAVID J. WILLIAMOWSKY, Primary Examiner

J. K. BELL, Assistant Examiner

U.S. Cl. X.R.

15—104.06; 137—268